E. MEITNER.
RANGE PREDICTING APPARATUS.
APPLICATION FILED MAY 4, 1915.

1,387,551. Patented Aug. 16, 1921.
7 SHEETS—SHEET 1.

INVENTOR.
ELMER MEITNER
BY Herbert H. Thompson,
ATTORNEY.

E. MEITNER.
RANGE PREDICTING APPARATUS.
APPLICATION FILED MAY 4, 1915.

1,387,551.   Patented Aug. 16, 1921.
7 SHEETS—SHEET 3.

INVENTOR.
Elmer Meitner
BY Herbert H. Thompson,
ATTORNEY.

INVENTOR.
Elemer Meitner
BY Herbert H. Thompson,
ATTORNEY.

E. MEITNER.
RANGE PREDICTING APPARATUS.
APPLICATION FILED MAY 4, 1915.

1,387,551.

Patented Aug. 16, 1921.
7 SHEETS—SHEET 5.

INVENTOR.
Elemer Meitner,
BY Herbert H. Thompson
ATTORNEY

E. MEITNER.
RANGE PREDICTING APPARATUS.
APPLICATION FILED MAY 4, 1915.

1,387,551.

Patented Aug. 16, 1921.
7 SHEETS—SHEET 6.

INVENTOR.
Elmer Meitner,
BY Herbert H. Thompson,
ATTORNEY.

Fig. 14.

UNITED STATES PATENT OFFICE.

ELEMER MEITNER, OF BROOKLYN, NEW YORK, ASSIGNOR, BY MESNE ASSIGNMENTS, TO FORD INSTRUMENT COMPANY, INCORPORATED, OF NEW YORK, N. Y., A CORPORATION OF NEW YORK.

RANGE-PREDICTING APPARATUS.

1,387,551. Specification of Letters Patent. Patented Aug. 16, 1921.

Application filed May 4, 1915. Serial No. 25,695.

*To all whom it may concern:*

Be it known that I, Dr. ELEMER MEITNER, a subject of the King of Hungary, residing at Brooklyn, N. Y., U. S. A., have invented certain new and useful Improvements in Range-Predicting Apparatus, of which the following is a specification.

This invention relates to range predicting and indicating apparatus for automatically indicating the variations of range between a gun and its target, so that the gunners may have constantly before them the correct range.

The objects of this invention are to construct a new and improved complete system for mechanically ascertaining from the data that is readily obtainable on the average war ship the average rate of change of the range, and for automatically transmitting such range to an instrument which I term the range clock, which compounds said rate of change with the initial range so as to show either or both the probable range at each progressive instant and the probable predicted range a predetermined interval ahead of the present time.

According to my invention, use is made of a novel recording or tracing instrument for plotting the relative course of the target and for mechanically combining and transmitting to a range clock the component of said course in the direction of the gun. Preferably also I provide automatic means in the range clock for transmitting any one or all of its readings to the gun turrets.

Referring to the drawings:

Fig. 4 is a sectional elevation of the tracing device.

Fig. 4ª is a diagram of the circuits of the transmitter and motor of the range calculator.

Fig. 6ª is a diagram of the circuits of the calculator.

Figure 7:
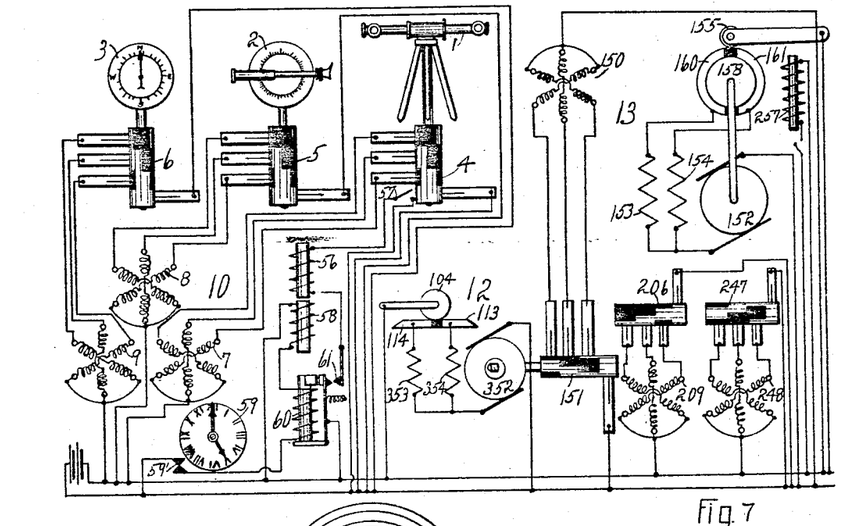
Fig. 7 is a wiring diagram of the entire system.

In the preferred form of my invention, the auxiliary instruments which are made use of to obtain the necessary data for my apparatus are the range finder 1 (Fig. 7), the target bearing telescope 2 and the master compass 3, although it will be apparent, as the description proceeds, that the latter instrument need not be used.

Figure 1:
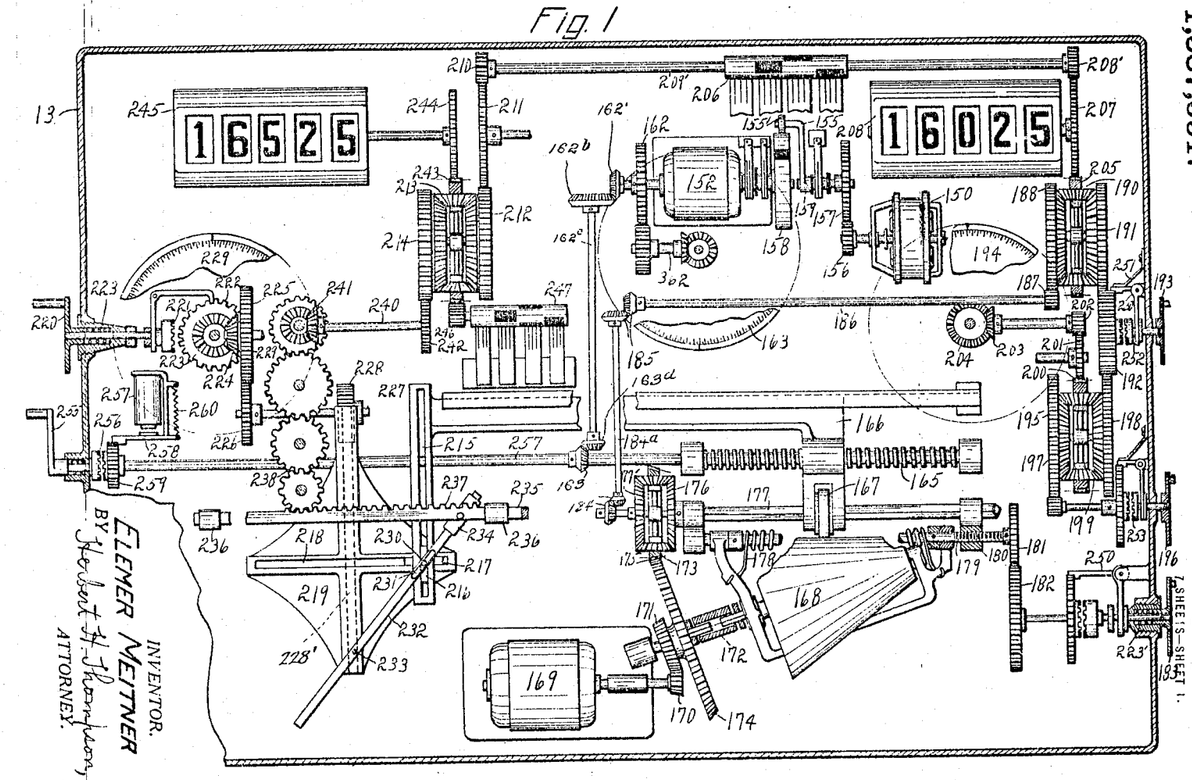
Figure 1 is a diagrammatic representation of the internal mechanism of one of the instruments forming a part of my system, which I term the range clock.
Figure 2:
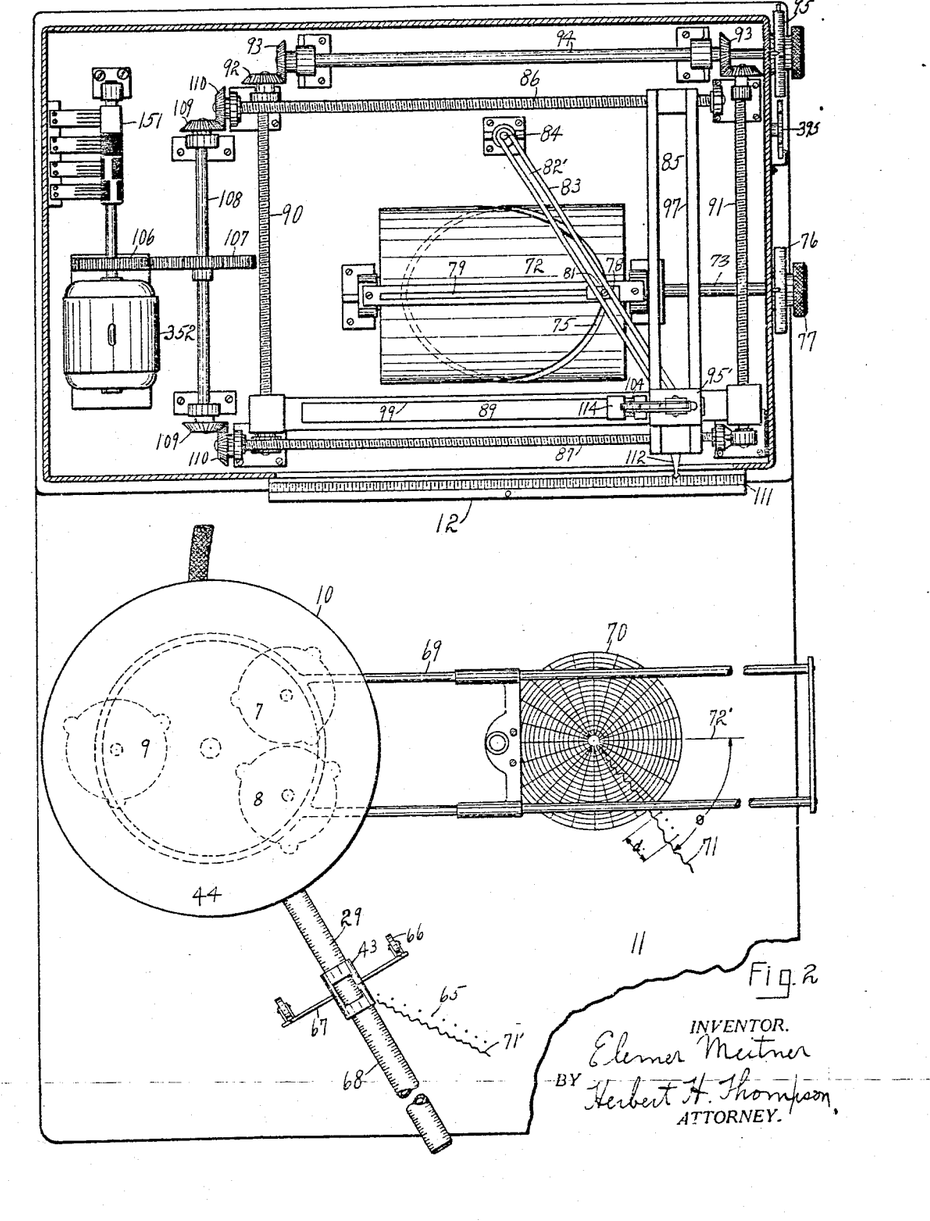
Fig. 2 is a plan view of another portion of my apparatus which I term the rate of change estimator. A portion of this figure is in section.

Electrical transmitters 4, 5 and 6, on or associated with the instruments, are employed to control at a distance repeater motors 7, 8 and 9, which form a part of the instrument which I term the rate of change estimator (Fig. 2). This instrument comprises a tracing device 10 adapted to record the relative course of the target on a sheet 11, in which the motors 7, 8 and 9 are mounted and a mechanical calculating device 12 for obtaining from the chart indications the approximate rate of change and for transmitting said rate automatically to the range clock 13 (Fig. 1). While I employ separate names to designate these instruments, and will necessarily have to describe them one by one, I wish it understood that they are all used together to form my novel system, and that in its broad aspect, my invention is not limited to the exact details of these instruments.

Figure 3:
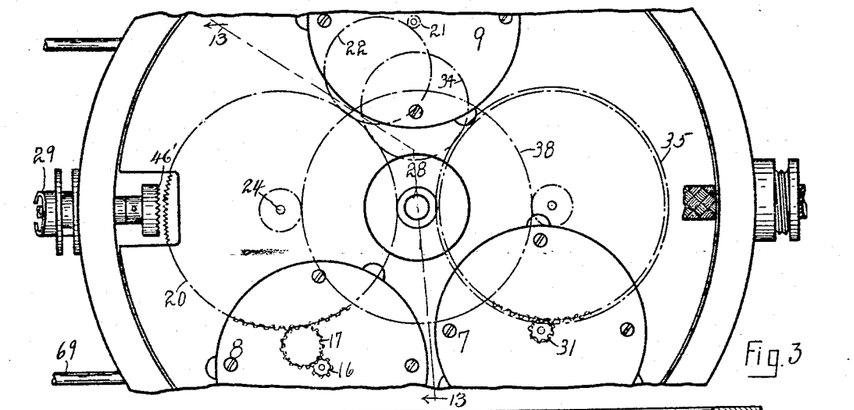
Fig. 3 is a plan view on a larger scale of a portion of said estimator, which I term tracing device.
Figures 4, 4A:
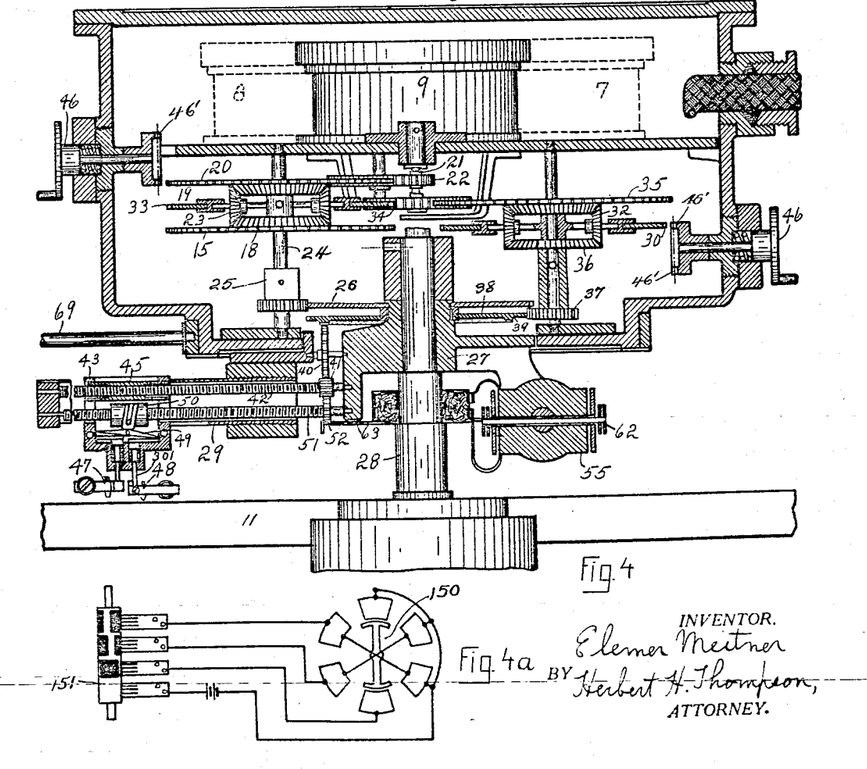
Figure 5:
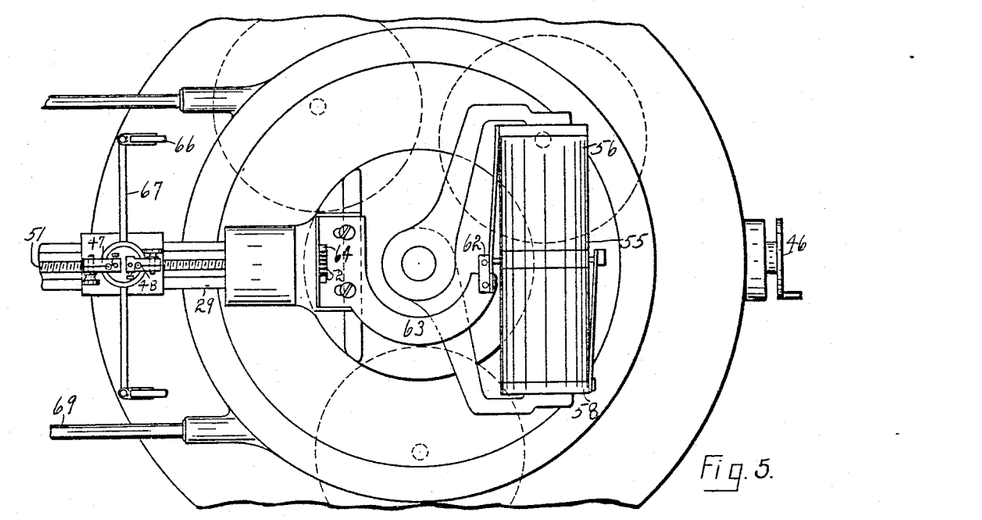
Fig. 5 is a bottom view of the tracing device.

The three motors 7, 8 and 9 above referred to, form a part of the tracing device 10 (Figs. 3 and 4). The motor 8 is geared to the large gear 15, through pinion 16 and idler 17. Said gear 15 serves to drive one arm 18 of the differential or epicyclic train of gearing 19, the opposite arm of which is driven through large gear 20. For this purpose gears 15 and 18 may be rigidly coupled. Said gear 20 derives its motion from the compass motor 9, through pinion 21 and idler 22. The central arm 23 of the train, therefore, is controlled by the joint action of the compass and the target bearing telescope. Said arm 23 is pinned to the central shaft 24, adjacent the lower portion of which pinion 25 is mounted.

Meshing with said pinion is large gear 26 which is secured to the sleeve 27, rotatably mounted upon the central supporting stem 28. Said sleeve 27 carries a long radial arm 29, which is secured to said sleeve to revolve with the same.

While I do not wish to be restricted to any specific gear ratios, it may be stated that the proportions should obey the following requirement. Assuming that the ship is stationary, the gearing should be such as to cause rotation of the arm 29 at the same angular velocity as the target bearing telescope; also assuming that the telescope is fixed with respect to the home ship, the gearing should be such as to cause rotation of the arm 29 at an angular velocity equal to the angular velocity of turning of the ship.

Assuming that the arm 29 is so placed on the chart as to correspond to the position of the target bearing telescope, this position will be automatically maintained. Thus, suppose that the target is stationary and that the home ship rotates through an angle A in a counter-clockwise direction. In order to keep on the target the telescope must be rotated through an angle A in a clockwise direction. Now it will be noted that under this assumption the position of the telescope in azimuth is unchanged and it will be shown that the position of the arm 29 on the chart 11 is also unchanged. The repeater 9 (connected to the compass) in the operation under the above assumption tended to cause revolution of the arm 29 through an angle A in one direction while the repeater 8 (connected to the telescope) tended to cause revolution of the arm 29 through an angle A in the opposite direction, so that the total rotative effect on arm 29 with respect to its chart was zero. It will thus be seen that the arm 29 maintains the same relative position on the fixed chart 11 that the target bearing telescope maintains in azimuth. Motor 7 is geared to the large gear 30 through the pinion 31, mounted on the motor shaft. Said gear 30 as shown forms the central arm of an epicyclic train of gearing 32. The other driving arm of said train is rotated from the central arm 23 of the epicyclic train 19, through the gear 33 mounted thereon, idler 34 and gear 35.

The driven portion of train 32 comprises bevel gear 36, which serves to drive the pinion 37. Meshing with said pinion is a double faced gear 38, one face of which is formed with crown gearing 39. An idler 40 may be used to transmit motion from said crown gear 39 to a pinion 41, secured upon a long threaded shaft 42, which is mounted within the arm 29.

A slidable carriage 43 is mounted on the arm 29, and is adapted to maintain itself at a distance from the center of the body portion 44 of the tracer which is proportional to the range of the target. For this purpose, the carriage is provided with a threaded portion 45, through which the screw 42 is threaded, so that upon rotation of the screw through the range motor 7, the carriage 43 is moved accordingly. The tracer may be provided with setting handles 46, the inner ends of which are provided with crown gears 46', which may be brought into mesh with one of the gears (20 or 30) of the epicyclical trains by pushing in on the handles. By this means the apparatus may be initially set so as to correspond to the readings of the master instruments, and may also be corrected if the motors fall out of step with their respective transmitters. Thus the handle 46 adjacent gear 30 will turn screw 42 through the instrumentalities already described and set the carriage 43 to its proper position on arm 29 with respect to the initial range, while the other handle adjacent gear 20 will set the angular position of arm 29 to show the initial target bearings.

Carriage 43 carries a tracing means 47 which is adapted to trace the relative course of the target with respect to the ship. Preferably also the carriage is provided with a time recording means 48 so that the relative speed of the target may be determined from the markings on the chart.

Figures 10, 11, 12, 13:
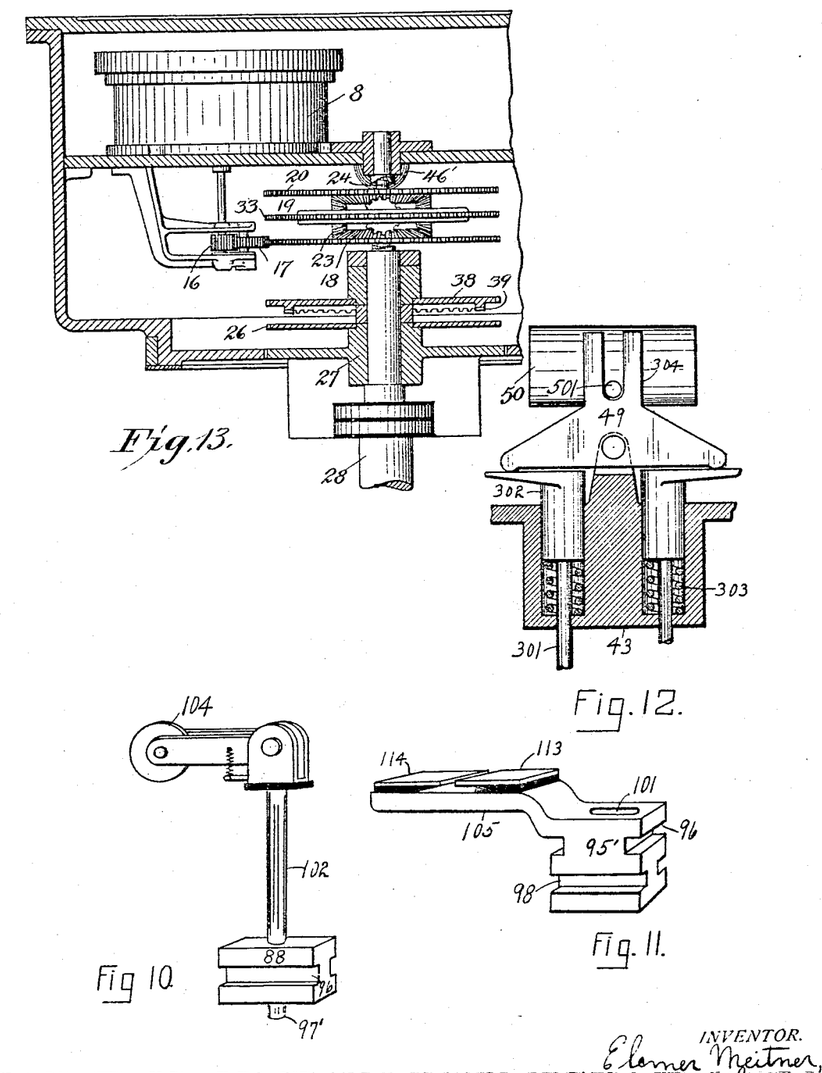
Figs. 10 and 11 are perspective views of a couple of details of portions of Fig. 6.
Fig. 12 is a detail of the tracing device shown in Fig. 4.
Fig. 13 is a fragmentary section taken on the line 13—13 of Fig. 3.
Figure 14:
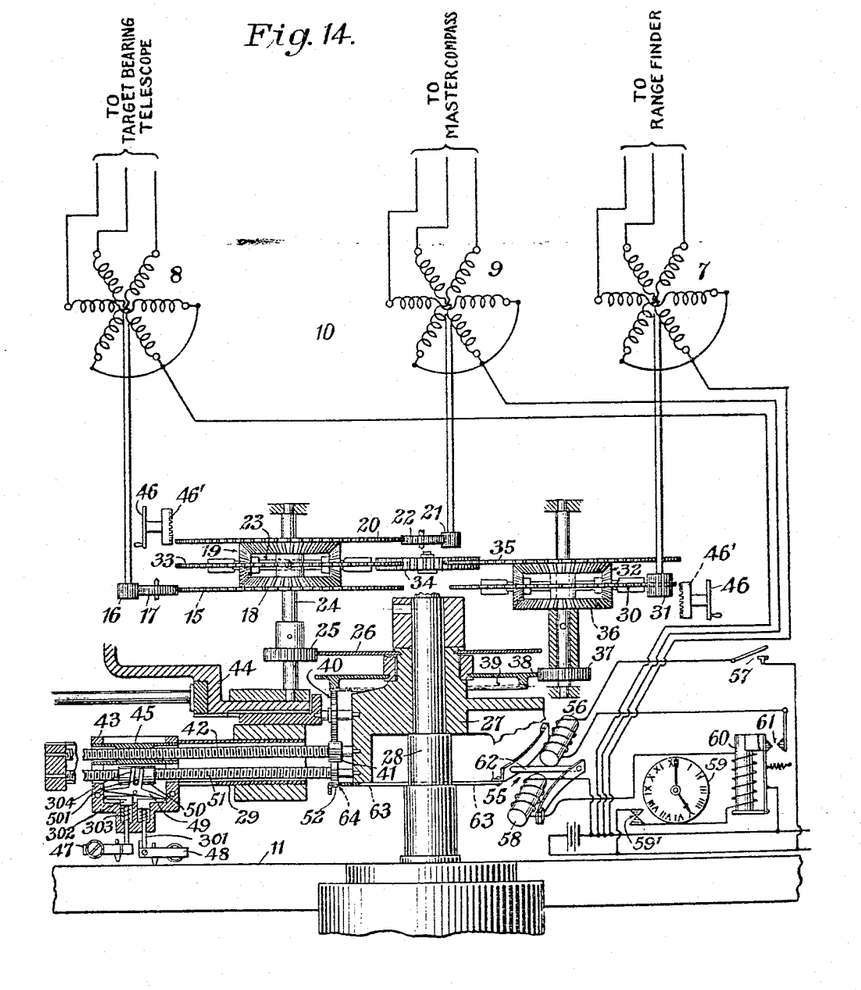
Fig. 14 is a diagrammatic view showing the relation of the apparatus of Figs. 3 and 4 to other elements of the system.

Each recording pen is independently supported on a stem 304, provided adjacent its upper end with an enlargement 302 (Fig. 12.) A compression spring 303 surrounds the upper portion of said stem and bears against said enlargement so as to hold normally each pen in an elevated position, and against the under surface of a rocker arm 49 pivotally mounted within carriage 43.

The upstanding portion 304 of said arm is provided with a slot in which a pin 501, mounted on non-rotatable nut 50, works. Said nut 50 is threaded on a screw 51, which extends parallel to screw 42, and is geared thereto by pinion 52. As shown, screw 51 is geared to rotate oppositely from screw 42, and is, therefore, reversely threaded with respect thereto, so that the nut 50 will travel with the carriage 43, and maintain a predetermined position with respect thereto, unless the screw 51 is moved longitudinally. Upon such translatory movement of said screw, however, it will be seen that the rocker arm above referred to will be rocked on its pivot and depress one or the other of the marking pens 47 or 48 so as to cause a mark to be recorded. This movement of screw 51 is accomplished automatically and periodically as follows: A double electro-magnet 55 is mounted on said tracing device. One coil 56 of said magnet is in circuit with a button 57 upon the range finder or indicator, so that when said button is closed by the operator a circuit will be completed through the coil. The other portion 58 of said magnet is in circuit with a clock 59, so that a current is sent through the magnet at periodic intervals.

Preferably means are provided to break the circuit through magnet 56 when the circuit through magnet 58 is completed. Such means (see Fig. 7) may comprise a relay 60, in the clock circuit, which automatically opens a switch 61 in circuit with the button 57 and magnet 56, when the contact 59' on the clock is closed.

The two magnets 56 and 58 are provided with a common armature 62, but are designed to pull the armature in opposite directions. Said armature is secured to a member 63, which is connected to screw 51, so as to move the same longitudinally. As shown, this connection comprises a slot 64, in member 63, which loosely fits a portion of the pinion 52 on the screw 51. In the normal operation of the device, the pen 47 is held down while button 57 is closed, but when the clock circuit is thrown in, the pen 47 is raised, and 48 lowered for an instant to make a dot 65, as will be readily apparent.

Referring now to Fig. 2 carriage 43, may be provided with supporting rollers 66 swiveled to arms 67 on the carriage to aid in supporting the long radial arm 29. Graduations 68 may be provided on the arm 29 so as to indicate the range directly to the observer.

To make use of the indications on the chart, I prefer to provide the tracer with a pair of arms 69 swiveled on body portion 44, which serve to slidably support the protractor 70. It should be remembered that the data it is desired to obtain is the rate of change of the range.

While the tracings on the chart furnish means by which this rate of change may be estimated, the following operation is necessary. Roughly speaking, the change in the range that takes place in a given interval is represented by the component of the relative course of the target during that interval in the direction of the target bearing line. To obtain this end we may resolve the line 71, representing the relative course or a given portion thereof, in the direction of line 72'. This may be done either graphically or by multiplying the length of such portion of line 71 by the cosine of the angle θ. The latter method is preferred to obtain accurate results, and for this reason I provide the mechanical calculating device 12, which not only performs this multiplication and indicates the rate of change, but serves to automatically transmit this rate of change to the range clock.

Figure 6:
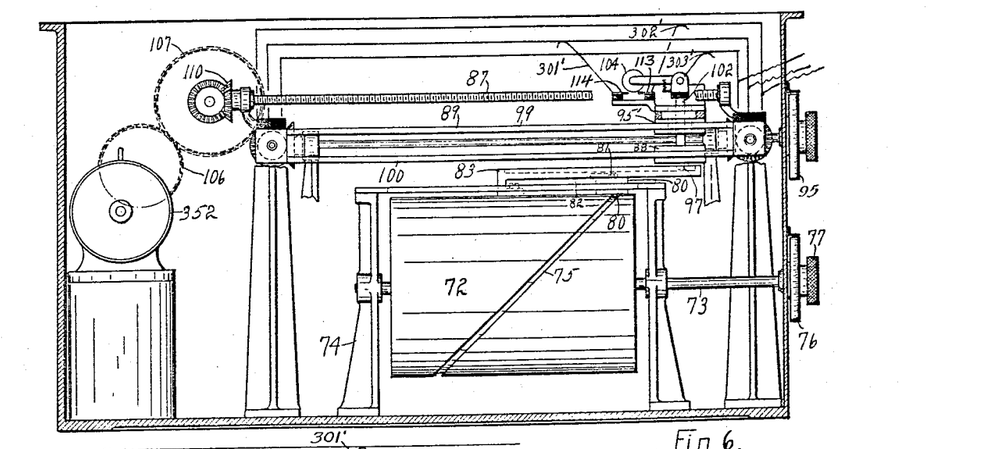
Fig. 6 is a sectional elevation of the mechanical calculator forming a part of the range estimator.
Figure 6A:
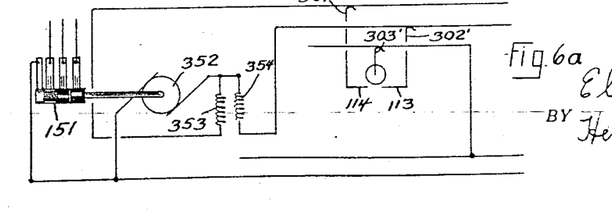

This calculator comprises a cylinder 72, mounted on an axle 73, rotatably supported in brackets 74. Said cylinder is provided with a circumferential slot 75, which preferably follows the intersection of an inclined plane with the surface of the cylinder. As is well known, such a slot will impart motion to a slide which is free to move only in an axial direction with respect to the cylinder, such that the movement of the slide is proportional to the cosine of the angle through which the cylinder is rotated. Accordingly, a circular scale 76 is provided on the axle of this cylinder so that this cylinder may be rotated through the angle θ indicated on the chart. A finger piece 77 may be used to rotate the cylinder. A slide 78 is mounted in a slideway 79, which extends parallel to the axis of the cylinder. Said slide is provided with a pin or finger 80 adapted to work in slot 75. Said slide 78 is also provided with a pin 81, which is free to slide in a slot 82 of the long lever 83, pivoted at 84, so that the motion of the slide is transmitted to said lever.

The motion of the lever in turn is transmitted to a slide 88 (see also Fig. 10) mounted on a longitudinal slideway 89, as by means of grooves 96, which take over guides 100 on the slideway. A downwardly extending pin 97' may serve to connect the lever and slide through slot 82'. The entire slideway 89 is mounted for transverse movement, being threaded at each end on screws 90 and 91, which are rotated from an indicator 95, adapted to be set to correspond to the relative speed of the target as shown on the chart, through any means such as bevel gears 92 and 93 and shaft 94. A star wheel 395 may be provided to count the revolutions of indicator 95. A second slideway 85 is transversely mounted within the calculator and is threaded on shafts 86 and 87 so as to be moved longitudinally of cylinder 72. Said shafts are rotated by means of a follow-up system hereinafter described. On the slideway 85 is mounted a double face slide 95', the grooves 96 of which take over guides 97 on slideway 85, while grooves 98 take over guides 99 on slideway 89.

An elongated aperture 101 is provided in slide 95', through which a post 102 on slide 88 extends. Each slide 88 and 95' carries one portion of an electrical contact device adapted to control a reversible motor 352. As shown, said device comprises a brush or trolley 104 mounted on post 102 and a pair of contact pieces 113 and 114, mounted on an extension 105 of slide 95'. The contact pieces are so connected to the oppositely wound field coils 353 and 354 of motor 352 as to reverse it when the trolley crosses from one contact to the other. Current may be supplied to the contacts by sliding contacts or trolleys, represented at 301', 302' and 303'.

Motor 352 not only serves to rotate screw shafts 86 and 87 through suitable gearing, such as idler 106 and gear 107, shaft 108 and bevel gears 109 and 110, and thus to cause the slideway or carriage 85 to follow the movement of trolley 104, but also furnishes power for rotating a transmitter 151, which is adapted to transmit automatically the calculated rate of change of range to the range clock. By means of this follow-up system, the multiplying linkage is relieved of the greater part of the strains incident to moving the slides and transmitter. If desired, indicating means may be provided on the calculator 12, whereby the rate of change may be shown thereon. Such means may assume the form of a stationary scale 111 and a pointer 112 mounted on carriage 85.

Coming now to the range clock proper, the rate of change is introduced through the repeater motor 150, which is in circuit with the transmitter 151 in the calculating device, 12. Since considerable power is required to actuate the mechanism within the range clock, and since the step-by-step type of repeater motor is likely to become unreliable if overloaded, I prefer to introduce between the repeater motor and the driving parts a power multiplying device in the nature of an electrical follow-up system. Said device is shown as comprising a reversible electric motor 152, with oppositely wound field coils 153 and 154 for controlling the motor.

A reversing contact switch is provided, one portion of which 155 is rotated by means of repeater motor 150, through suitable gears 156 and 157. The other portion 158 is designed to follow the movements of portion 155 by being connected to the motor 152. Portion 155 is shown as a trolley 155' mounted on a rotatable arm 159, secured to the shaft of gear 157, while portion 158 comprises a pair of reversible contacts 160 and 161 mounted on a disk secured to the shaft of motor 152. Mounted on the motor shaft are a pair of gears 162 and 162', the latter serving to drive a rate of change indicator 163 on the range clock through any form of suitable gearing 362. Gear 162' meshes with another gear 162$^b$ mounted on a shaft 162$^c$ which carries at its opposite end a gear 163$^a$ that meshes with gear 163, secured to shaft 257. Threaded on a portion of shaft 257, is a slidable carriage 166, on which is rotatably mounted a friction roller 167. A speed cone 168, driven by a constant speed motor 169, is arranged to drive said roller. Motor 169 may be connected thereto, through bevel gears 170 and 171 and a flexible or loose coupling 172, to permit a certain amount of freedom for the cone.

I also drive from said motor one arm 173 of an epicyclic train of gearing, through gears 174 and 175. The bevel gear 176 forming another arm of said train is mounted on the squared shaft 177, on which roller 167 is slidably but not rotatably mounted, so that rotation of the roller will rotate bevel gear 176. It will hence be seen that the driven bevel gear 177' of said train, will receive a motion which is the resultant of the motion of cone 168 and roller 167.

A coil spring 178 may be provided to hold the cone into close engagement with the roller. Also means may be provided to accurately adjust the position of the cone with respect to the roller such as by threading the shaft 179 on which the cone is mounted in a fixed bracket 180 and by providing gearing 181 and 182 through which said shaft may be rotated from a handle 183. Motion of the driven bevel gear 177' is transmitted by means of bevel gears 184 and shaft 184$^a$ to bevel gears 185, and thence by means of shaft 186 to pinion 187, which meshes with gear 188.

One arm of an epicyclic train 190 is driven by said gear 188, the opposite arm being geared through gears 191 and 192 to a setting handle 193. Said setting handle is designed to be used both for initially setting the clock to indicate the initial range, and also to introduce the spotter's correction. The amount of the spotter's correction is shown on a dial 194.

Said dial is driven indirectly from gear 192, through another epicyclic train 195, in order that the dial may be brought back to zero after each spotter's correction is introduced. For this purpose, a setting handle 196 is provided, which drives the arm 197 of the epicyclic train 195.

The other driving arm 198 is rotated from gear 192, while driven arm 199 drives the dial 194 through any suitable form of gearing such as gear 200, idler 201, pinion 202 and bevel gears 203 and 204.

Returning now to the epicyclic train 188, the driven arm of such train is provided with gear 205, which drives gear 207 on the range indicator 208, which in this form of device is shown as a counter.

Means are provided whereby the indications of the range clock will be automatically transmitted to range indicators in the turrets, or in other convenient positions on the ship. For this purpose, a transmitter 206 may be provided, which may be driven from gear 207, by pinion 208′, through the shaft 209′. Said transmitter is designed to govern a repeater motor 209, mounted to actuate some form of range indicator.

I also prefer to equip the range clock with means whereby a predicted range may be indicated. It will be seen that the indicator 208 will show at each instant the probable range at that instant, but it is often desired to know what the range will be a predetermined interval ahead of the present so that the guns may be trained for the future range and be fired when such predetermined interval elapses. For this purpose, the rotation of the indicator 208 is transmitted through shaft 209′, pinion 210 and idler 211 to arm 212, of an epicyclic train 213.

The opposite arm 214 is driven from a computing mechanism, which will now be described in detail. The slide 166, which carries roller 167, is also provided with a slot 215, extending at an angle to the line of movement of said slide. A slide 216 works in said slot, which is provided with a pivoted cross piece 217, adapted to slide in a slot 218, in a member 219. The movement of member 219 is controlled by means of a crown gear 221, mounted on the shaft of a handle 220, said gear being adapted to mesh with a gear 222, upon the handle being pushed inwardly against the action of the spring 223′.

Upon the shaft of gear 222 is mounted a bevel gear 223, driving gear 224, which carries gear 225. Gear 226, mounted on shaft 227, meshes with gear 225, and serves to rotate rack pinion 228, which meshes with a rack 228′ upon the under surface of member 219. The gear 222 also is used to rotate a dial 229, which serves to indicate the predicted time for which the apparatus is set. By combining the predicted time interval with the motion of carriage 166, which motion is the rate of change of range, the change of range for the predetermined interval may be determined. For this purpose, the slide 216 mentioned above is provided with a pin 230, working in a slot 231, in lever 232. Said lever is pivoted to the member at 233, and is slidably mounted in a sleeve 234, pivotally secured to a rod 235. Said rod is slidably mounted in fixed bearings 236, and is provided with rack teeth 237, whereby its motion may be transmitted to the indicator. For this purpose, a series of gears 238 may be provided, which drive through two bevel gears 241, shaft 240.

The motion of shaft 240 serves as a measure of the amount that must be added to the present range to show the future range. This amount may be added through the differential train 213 described above, the pinion 242 meshing with gear 214. The driven arm of said train rotates the predicted range indicator 245 through gears 243 and 244.

Also driven from said gear 243 is a pinion 246, which serves to drive transmitter 247, adapted to control repeater motors 248 in the turrets.

In connection with some of the setting handles on the range clock, I have shown an automatic lock which serves to lock that portion of the epicyclic train which is controlled through the setting handle, when the setting handles are not being used. These locks are shown as comprising a bell crank lever 250, one arm of which is normally pressed by means of a spring 251 into engagement with the teeth of a gear or a notched wheel to lock the same. The other arm is connected to a collar 252 on the setting handle so that as the setting handle is pushed in to engage the clutch teeth 253, the first mentioned arm of the bell crank lever is automatically lifted out of engagement with the teeth, thereby releasing the lock.

In connection with setting handles 183 and 220, coil springs 223′ are made use of instead of flat springs similar to spring 251. A setting handle 255 is also provided to adjust the position of the slide 166, said handle being adapted upon being pushed inward to engage clutch teeth 256, the driven portion of which are mounted on the shaft 257 of gear 163. In connection with this handle, a somewhat different form of stop is shown. Said stop comprises in this instance, an electro-magnet 257′ in the circuit of motor 169, the armature 258 of said magnet serving as a lock for the toothed wheel 259 on shaft 257 as long as no current is passing through the motor circuit. But when motor 169 is running, the electro-magnet will draw up armature 258 against the action of spring 260 and release the stop. The purpose of this arrangement is to make it impossible to adjust the roller 167 except when cone 168 is running, since an attempt to do otherwise would injure the wearing surfaces of both the cone and roller.

Figure 8:
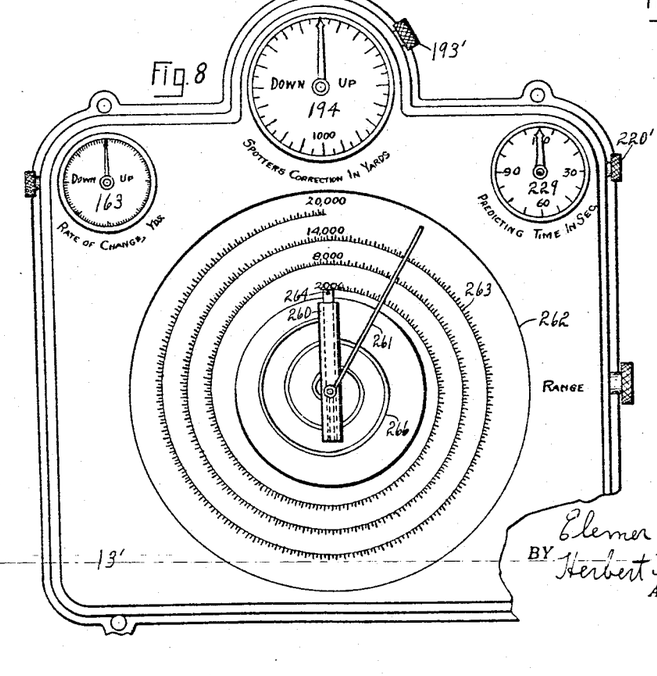
Fig. 8 is a plan view of a modified form of range clock.
Figure 9:
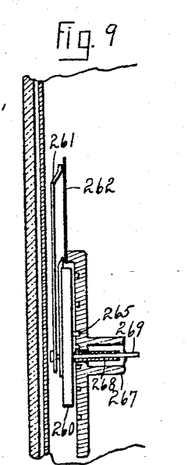
Fig. 9 is a detail thereof.

Figs. 8 and 9 show a modified form of range clock in which the two range indicators, present and predicted, are shown in the form of two pointers 260 and 261, with a coöperating dial 262 therefor. In order to give the dial a sufficient range, it is graduated in the form of a spiral 263.

One of the pointers 260, comprises a slidable member 264, which is provided with a pin 265, adapted to work in a spiral groove 266, as the dial is rotated. By this means a ready means of telling which portion of the spiral should be used is provided, as the member 264 is automatically advanced by each complete rotation of the dial the radial distance between the successive convolutions.

Pointer 261, which is preferably used for the predicted range, may be of simpler form, as, from the nature of the device, the two pointers will always be read on the same convolution. Dial 262 is shown as mounted on a rotatable sleeve 267, within which a fixed hollow shaft 268 for pointer 260 is mounted. Pointer 261 may be mounted on a central shaft 269. The operating mechanism is not shown, since it may be similar to the mechanism shown in Fig. 1, except that shaft 269, carrying pointer 261, is rotated directly from the multiplying mechanism, as, for instance, from shaft 240 (Fig. 1) without the interdisposition of a differential gearing 213.

The operation of the entire apparatus is as follows: The mechanical operation of the tracing device 10 needs no further explanation, it is thought. It should be noted, however, that the device would remain operative even if the compass motor 9 were omitted, as long as the ship kept on the same course, and, since in practice the portions of the traced lines which are measured are short, that the device would give fairly accurate results without motor 9.

In using the device, the operator first allows a short line (71) to be traced. In order to measure a portion of this line and the angle θ, he then may turn the arm 29 out of the way as to the position shown in Fig. 2, either by one of handles 46 or by grasping the arm directly. The arms 69 and protractor 70 are then moved into position so that the angle θ may be measured. The length of a portion of line 71 such as portion $d$ may be measured by a rule or other instrument. While the operator is taking these readings, the tracer is recording a new line 71', so that a continuous record is obtained.

The data obtained by the above mentioned readings is placed in the calculator 12 by setting indicators 76 and 95, and transmitter 151 transmits automatically the calculated rate of change of range to the range clock 13. Said clock having been initially set to the range as it was found to exist, when the clock is started by handle 193, will then automatically indicate the variable range, both at the present instant and at a predetermined future interval. Briefly, this is accomplished by varying the position of friction roller 167 on the surface of speed cone 168 according to the rate of change of range. Since this rate becomes both positive and negative, I introduce a differential train 175 between roller 167 and the range indicator, whereby the required result is achieved without the necessity of stopping or reversing the roller.

The change of range is continually added to the initial range through differential 190 and the present range indicated at 208.

The rate of change of range is also utilized in the range predicting portion of the clock, where it is multiplied by the predicted time by the linkage 216—235, thereby indicating the amount that must be added to the present range to obtain the future range.

In Fig. 1, this addition is performed by differential train 213, while in Figs. 8 and 9 it is performed by reading pointer 261 on the movable dial 262.

While the two indicators 208 and 245 are designed to be used as present and future range indicators, other uses are possible, depending on the amplitude of the predicting time. For instance, since indicator 208 does not show the precise present range, but always lags a comparatively constant interval behind, due to the time taken to determine and transmit the range, indicator 245 may be set to indicate the true present range, by properly setting the predicting time. Also use may be made of indicator 245 to allow for variations in the deflection of the shell due to variable weather conditions, the officer in charge merely increasing or diminishing slightly the indicated predicting time to allow for increased or decreased deflection.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also while it is designed to use the various features and elements in the combination and relations described, some of these may be altered and others omitted without interfering with the more general results outlined, and the invention extends to such use.

Having described my invention, what I claim and desire to secure by Letters Patent is:

1. The method of determining the rate of change of the range, which consists in mechanically recording as a single vector the relative course and speed of the target and resolving such a vector in the direction of the instantaneous target bearing as indicated on the chart as a single vector, 2. The method of determining the rate of change of range of a target which consists of plotting the relative positions of the target at successive time intervals and obtaining a single vector of the relative course and speed of the target and then resolving the vector thus obtained into its range rate component along the line of fire.

3. In a range indicator, the combination with means whereby the relative velocity and bearings of the target may be determined, of means for mechanically obtaining therefrom the rate of change of range comprising a cam slot adapted to be set to the angle between the relative course and the target bearings, a slide adapted to be set to a position indicating the relative speed of the target, a pivoted lever having a pin engaging said cam slot and pivoted to said slide and a slide at an angle to said other slide connected with said lever, and means whereby the position of said last mentioned slide may be observed.

4. In a calculating device for combining a plurality of quantities, the combination with a plurality of indicators for the known quantities, of an electrical contact controlled as a resultant of such quantities, a coöperating contact therefor, a motor in circuit with said contacts, and connections between said motor and said coöperating contact whereby said contact follows the movements of said first mentioned contact.

5. In a calculating device for resolving a vector in a predetermined direction, a rotatably mounted cylinder having a slot cut on its surface which defines the points of intersection between an inclined plane and the cylinder, a slide engaging said slot and a guideway therefor, means whereby the cylinder may be turned through the angle which the vector makes with respect to said direction, a slideway having a slide adapted to be set to indicate the vector, a second slideway and slide at an angle to the first, a pivoted lever having a slidable connection with each of said slides and indicating means associated with said last mentioned slide.

6. In variable range apparatus, consisting in the combination of means for initially setting the apparatus to the present range, of a repeating device adapted to be actuated from a rate of change indicator, a continuously actuated member, means for compounding the movements of said setting means, said member and said repeating device, whereby the variable range is automatically indicated.

7. In optical indicating apparatus, a differential gear train including three arms, an indicator proper, driven by one arm of said train, automatic means for driving a second arm, a normally operative lock for the third arm, a normally inoperative manual setting means adapted to drive on actuation said third arm, and means whereby said lock is rendered inoperative on actuating said setting means.

8. In a range clock, a variable speed mechanism comprising a speed cone, means for driving said cone at a constant speed, a friction roller driven by said cone, the position of said roller being set according to the rate of change of range, a differential train of gearing including three arms, one arm of which is driven by said driving means, while another arm is driven by said roller, whereby the third arm will remain at rest when the roller is adjacent a predetermined position on the cone.

9. In a range indicator, means for determining the change of range that takes place over a predetermined interval comprising a member having a slot constrained to assume a position with respect to the magnitude of the rate of change of range, a second member having a slot adapted to move parallel to said first mentioned slot, means for setting said second member in accordance with the time interval desired and perpendicular to the other slot, a common slide for the slots, a lever pivoted to said second member and to said slide, a bar constrained to move parallel to said second mentioned slot and slidably secured to said lever, and means for registering the movements of said bar.

10. In a range clock, a range indicator, a spotter's correction indicator, hand means for initially setting the range indicator and for introducing the spotter's correction into said range indicator, a second hand means, a differential gear train, each of said means being connected to an arm of said train, and connections between the third arm of said train and said correction indicator, whereby it may be brought back to zero.

11. In a range clock, a range indicator, a spotter's correction indicator, hand means for initially setting the range indicator, and for introducing the spotter's correction into said indicator, a second hand means, a differential gear train, each of said means being connected to an arm of said train, connections between the third arm of said train said correction indicator, whereby it may be brought back to zero, and a releasable lock for the arm of the train to which the hand means are connected.

12. In a range clock, a range indicator, a spotter's correction indicator, hand means for initially setting the range indicator, and for introducing the spotter's correction into said range indicator, a second hand means, automatic indicating mechanism, a differential gear train, said first hand means, said mechanism and said range indicator being connected to the three arms of said train respectively, and a second differential train, one arm of said first train, said second hand means and said spotter's correction indicator being connected to the three arms of said train, respectively.

13. In a range clock, a variable speed mechanism comprising a constant speed rotating member, a friction roller actuated by said member and positioned with respect thereto in accordance with the rate of change, a three arm differential one arm of which is driven at constant speed while another arm is driven by said roller whereby the third arm will remain at rest when the rollers are at a predetermined position with respect to said member.

In testimony whereof I have signed my name to this specification this first day of May, 1915.

Dr. ELEMER MEITNER.

---

235=61

It is hereby certified that in Letters Patent No. 1,387,551, granted August 16, 1921, upon the application of Elemer Meitner, of Brooklyn, New York, for an improvement in "Range-Predicting Apparatus," an error appears in the printed specification requiring correction as follows: Page 7, lines 88 to 90, claim 9, strike out the words "means for setting said second member in accordance with the time interval desired" and insert the same to follow the word "slot," line 91; and that the said Letters Patent should be read with this correction therein that the same may conform to the record of the case in the Patent Office.

Signed and sealed this 15th day of November, A. D., 1921.

[SEAL.]

KARL FENNING,
Acting Commissioner of Patents.